US006308753B1

(12) United States Patent
Nimberger et al.

(10) Patent No.: US 6,308,753 B1
(45) Date of Patent: Oct. 30, 2001

(54) SYSTEM FOR LOADING AND UNLOADING FLUID TANKS CONTAINING HAZARDOUS FLUIDS

(75) Inventors: Spencer M. Nimberger, Houston; Robert L. Ward, Missouri City, both of TX (US)

(73) Assignee: PGI International, Ltd., Houston, TX (US)

( * ) Notice: Subject to any disclaimer, the term of this patent is extended or adjusted under 35 U.S.C. 154(b) by 0 days.

(21) Appl. No.: 09/518,535

(22) Filed: Mar. 4, 2000

(51) Int. Cl.[7] .................................................. F16K 31/00
(52) U.S. Cl. ............................. 141/382; 137/1; 137/487; 137/492.5; 137/596.14; 137/68.14
(58) Field of Search .......................... 137/1, 68.14, 486, 137/487, 492, 492.5, 596.14, 596.15; 222/61, 63; 141/382

(56) References Cited

U.S. PATENT DOCUMENTS

| 3,016,928 | * | 1/1962 | Brandt .................................. 141/45 |
| 4,520,844 | * | 6/1985 | Finkelstein et al. ................. 137/486 |
| 4,957,238 | * | 9/1990 | Kreuter ................................ 137/487 |
| 5,921,266 | * | 7/1999 | Meyer ............................... 137/68.14 |
| 6,012,482 | * | 1/2000 | Nelson et al. .................... 137/492.5 |

OTHER PUBLICATIONS

Two advertising sheets of Lifeline Technologies, Inc. entitled "Smart–Hose", considered as prior art, dates of publication unknown.

* cited by examiner

Primary Examiner—J. Casimer Jacyna
(74) Attorney, Agent, or Firm—Browning Bushman

(57) ABSTRACT

A system for transferring a hazardous fluid product from a transport tank (10) of a roadway vehicle (12) to a fixed storage tank (14). A flexible transfer hose assembly (30) has end couplings (34, 36) which are detachably connected between the transport tank (10) and storage tank (14). A gas operated product supply valve (44) is opened by pressurized gas to permit flow of the hazardous product, such as propane, from tank (10). A gas control valve (46) controls the flow of pressurized gas to gas operated product supply valve (44). Upon a separation or rupture of flexible hose (31) or couplings (34, 36), the fluid pressure of the hazardous product in hose (31) is sensed at fluid sensing chamber (94) in gas control valve (46). A reduction in sensed fluid pressure to a predetermined maximum pressure results in movement of piston (82) to the position shown in FIG. 2 in which pressurized gas from gas source (43) is vented to atmosphere to result in closing of gas operated product supply valve (44) to stop the flow of hazardous product from tank (10). FIG. 7 shows the transfer of the hazardous fluid from a storage tank (14A) to a tank (10A) of a roadway vehicle.

42 Claims, 5 Drawing Sheets

SYSTEM FOR LOADING AND UNLOADING FLUID TANKS CONTAINING HAZARDOUS FLUIDS

FIELD OF THE INVENTION

This invention relates to a system for loading and unloading fluid tanks containing hazardous fluids, and more particularly to such a system in which one of the tanks is mounted on a roadway vehicle and the other tank is a fixed storage tank.

BACKGROUND OF THE INVENTION

Hazardous fluid products are transferred between a fixed storage tank and a tank on a roadway vehicle. Normally, a flexible transfer hose assembly is detachably coupled to the tank at the loading or unloading site. The opposed ends of the transfer hose assembly are normally fitted with rotatable couplings that are threaded onto male pipe ends extending from the tanks for connection of the flexible hose assembly. It is possible under certain conditions during transfer of the hazardous fluid product that the flexible hose of the hose assembly may separate from the couplings, or the flexible hose may fail, resulting in release of the hazardous product to atmosphere. Such a release of the hazardous product, such as propane or anhydrous ammonia, for example, could result in a life threatening situation.

While back check valves adjacent the tanks may, in many instances, stop the flow of the hazardous product upon failure of the flexible hose or couplings, pumps or other inline devices at the unloading tank in many instances will restrict the effectiveness of the excess flow valve typically installed in the outlet piping on the vehicle. It is necessary that flow of the hazardous fluid product be stopped at each of the tanks upon failure of the hose assembly in order to stop discharge of the hazardous product into the atmosphere.

It is desired that a safety system be provided for automatically shutting off the flow of product for each tank without human intervention upon a failure in the hose assembly between the tanks.

SUMMARY OF THE INVENTION

The present invention is directed to a system for loading and unloading fluid tanks containing hazardous fluids, and particularly an apparatus and method for transferring a hazardous fluid product through a flexible hose assembly detachably connected between a tank of a roadway vehicle and a fixed storage tank. The hazardous fluid product in one embodiment is transferred from the roadway vehicle tank to the storage tank and in another embodiment the hazardous fluid product is transferred from the storage tank to the roadway vehicle tank.

A gas operated product supply valve from the tank being unloaded is maintained in an open position during normal product transfer by pressurized gas to permit product flow to the tank being loaded. A gas control valve is mounted between a gas source for the gas operated product supply valve and the product supply valve to control the supply of pressurized gas to the product supply valve. The gas control valve senses the product fluid pressure in the flexible transfer hose and is effective in the event a predetermined low pressure is sensed in the transfer hose to exhaust gas from the gas operated product supply valve to effect movement of the product supply valve to a closed position to stop product flow from the tank being unloaded. A back check valve for the tank being loaded is effective to stop any back flow from the tank being loaded.

The gas control valve has an inlet port in fluid communication with a pressurized gas source, an outlet port in fluid communication with the gas operated product supply valve and a vent between the ports. A piston valve member in the gas control valve is responsive to fluid pressure from the product flowing through the flexible hose and is movable between a pressurized normal operating position and a non-pressurized emergency position. In the pressurized normal operating position, the piston valve member is actuated and effective to block fluid communication between the inlet port and vent, and to permit the supply of pressurized gas to the gas operated product supply valve for opening of the product supply valve during normal operation for product transfer between the tanks. In the emergency position, the piston valve member is responsive to zero or low fluid pressure from the product flowing through the flexible hose to permit fluid communication between the inlet port and the vent for exhaust of pressurized gas from the gas operated product supply valve when the fluid pressure of the product flowing through the flexible hose is below a predetermined minimal pressure.

A sensing line in the flexible hose extends to a piston sensing chamber for the piston valve member to communicate product pressure to the piston valve member. Thus, in the event the product transfer hose is separated from end couplings, or fails, and the product is being discharged into the atmosphere, a low pressure in the transfer hose is sensed by the gas control valve to exhaust gas from the gas operated product supply valve for moving the product supply valve to a closed position to stop product flow automatically from the tank being unloaded.

The fluid sensing line has a small diameter internal portion extending from a fitting on the hose assembly within the flexible hose for sensing the fluid pressure resulting from product flow in the hose. A flexible external portion of the sensing line extending from the fitting is detachably connected to the gas control valve to provide fluid communication with the sensing chamber adjacent the piston valve member of the gas control valve. Upon a break or separation in the hose, a rapid reduction or decrease in the fluid pressure of the hose results which is sensed by the gas control valve for movement of the piston valve member to an exhaust position for exhausting the gas from the gas operated product supply valve to effect closing or shut-off of the product supply valve. The internal portion of the product sensing line in the transfer hose comprises a relatively small diameter tube having an open end and preferably formed of a plastic material of a diameter of about ¼ inch. Any failure of the sensing line results in a reduction or decrease of the fluid pressure sensed by the gas control valve resulting in the exhaust of pressurized gas to the gas operated product supply valve.

It is an object of this invention to provide a safety system for a detachable flexible hose assembly coupled between a storage tank and a tank of a roadway vehicle for transferring a hazardous fluid product between the tanks so that product flow is stopped in both directions without human intervention upon a hose or coupling separation or failure.

It is a further object of the invention to provide such a safety system in which the tank for the hazardous fluid product being unloaded has a gas operated product supply valve which is maintained in a normal operating open position by pressurized gas and moves to a closed position to stop flow of hazardous product from the tank upon an exhaust of gas from the gas operated product supply valve.

Another object of the invention is the provision of a gas control valve to control the supply of pressurized gas to the gas operated product supply valve for the opening and closing of the gas operated product supply valve upstream of the flexible hose.

A further object of the invention is the provision of a passive shut-off means for stopping the flow of product from the tank being unloaded without the need for human intervention within twenty (20) seconds of the occurrence of an unintentional release caused by separation of the discharge hose or coupling.

Other objects, features, and advantages of the invention will be apparent from the following specification and drawings.

EMBODIMENT OF FIGS. 1–6

Figure 1:
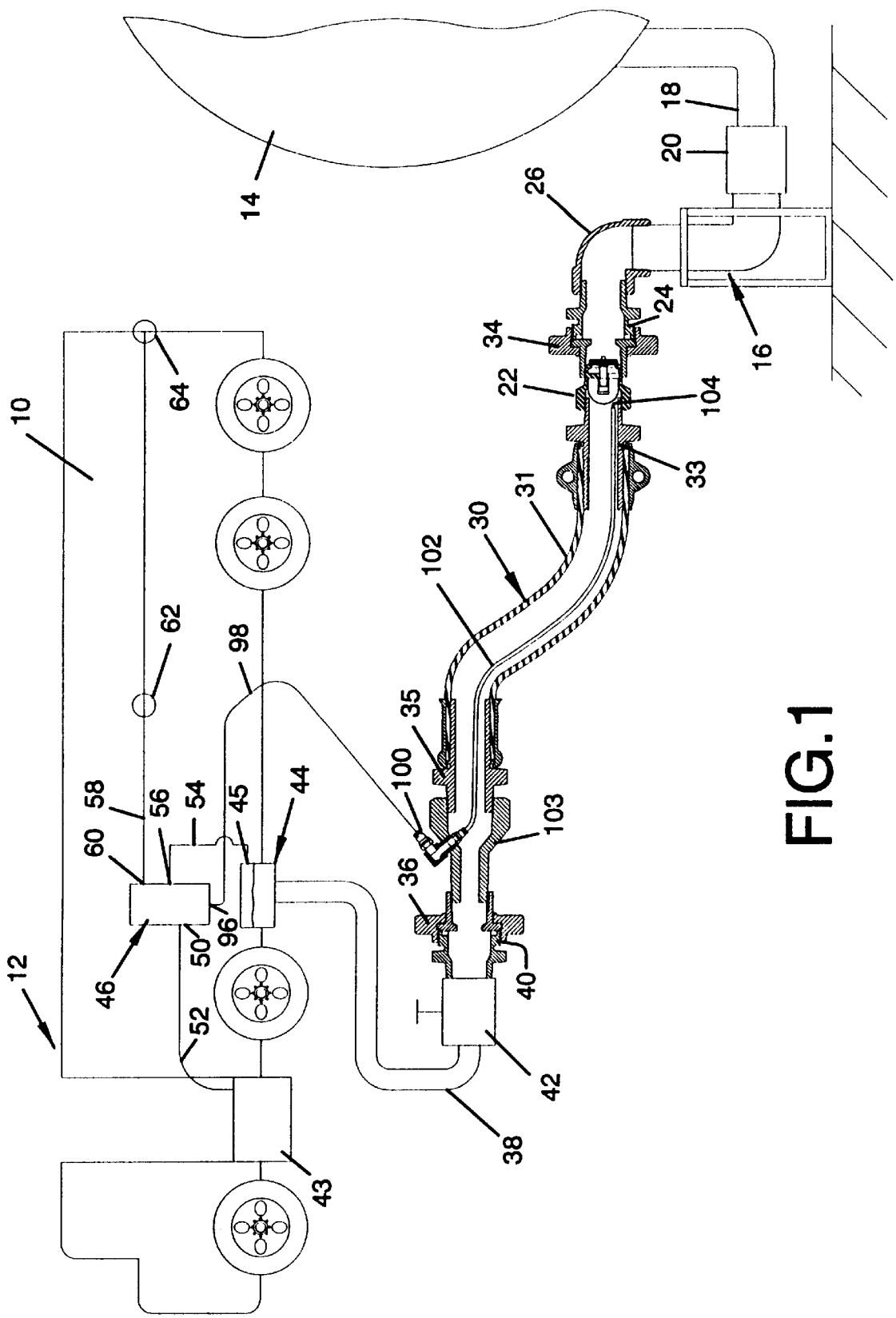
FIG. 1 is a schematic view of the system comprising the present invention in which a flexible hose assembly is coupled between a tank for a roadway vehicle and a fixed storage tank for transferring a hazardous fluid product from the tank of the roadway vehicle to the fixed storage tank.

The system including the apparatus and method of the present invention shown in FIGS. 1–6 illustrates the transfer of a hazardous fluid product from a transport. tank 10 of a roadway vehicle generally indicated at 12 to a fixed storage tank 14. A fixed bulkhead generally indicated at 16 adjacent fixed storage tank 14 provides a support for a supply pipe 18 extending from storage tank 14. Mounted in supply pipe 18 is a gas operated emergency shut-off valve generally indicated at 20. An externally threaded male fitting 24 on the extending end of elbow 26 on pipe 18 is adapted to receive in threaded relation a detachable flexible transfer hose assembly generally indicated at 30. Hose assembly 30 includes a flexible hose 31 extending between internally threaded couplings 34 and 36 on opposed ends of the transfer hose assembly 30. A back check valve assembly generally indicated at 22 is mounted on hose assembly 30 adjacent coupling 34. Suitable sleeve fittings 33 and 35 extend between flexible hose 31 and end couplings 34 and 36. Transfer hose assembly 30, for example, may be about twenty (20) feet in length. Transport tank 10 is particularly adapted for the transport of hazardous liquid or gaseous fluid products, such as propane or anhydrous ammonia, for example, and it is necessary that the flow of the hazardous product be stopped immediately upon the occurrence of an unsafe condition, such as the rupture or separation of the hose or coupling during loading or unloading of the hazardous product.

Tank 10 has a rigid unloading line or pipe 38 with an externally threaded male end 40 thereon for detachable connection to coupling 36 of hose assembly 30. A manually operated outlet valve 42 is mounted in line 38 and is manually opened for flow of the hazardous product to tank 14. A gas operated product supply valve generally indicated at 44 is mounted on tank 10 and opens only when pressurized gas, such as air, is supplied to a gas actuator 45 for product supply valve 44. A suitable air operated product supply valve for outlet valve 44 is sold as model C404A-32 by Fisher Controls.

It is necessary that a passive shut-off means be provided that will automatically shut-off the flow of the hazardous product at tank 10 without the need for human intervention within a short time after any separation or failure of hose 31 or hose assembly 30 between tanks 10 and 14. The present invention is directed particularly to such a passive shut-off means. For that purpose, a gas control valve generally indicated at 46 is provided to control the flow of pressurized gas to gas operated product supply valve 44.

Figure 2:
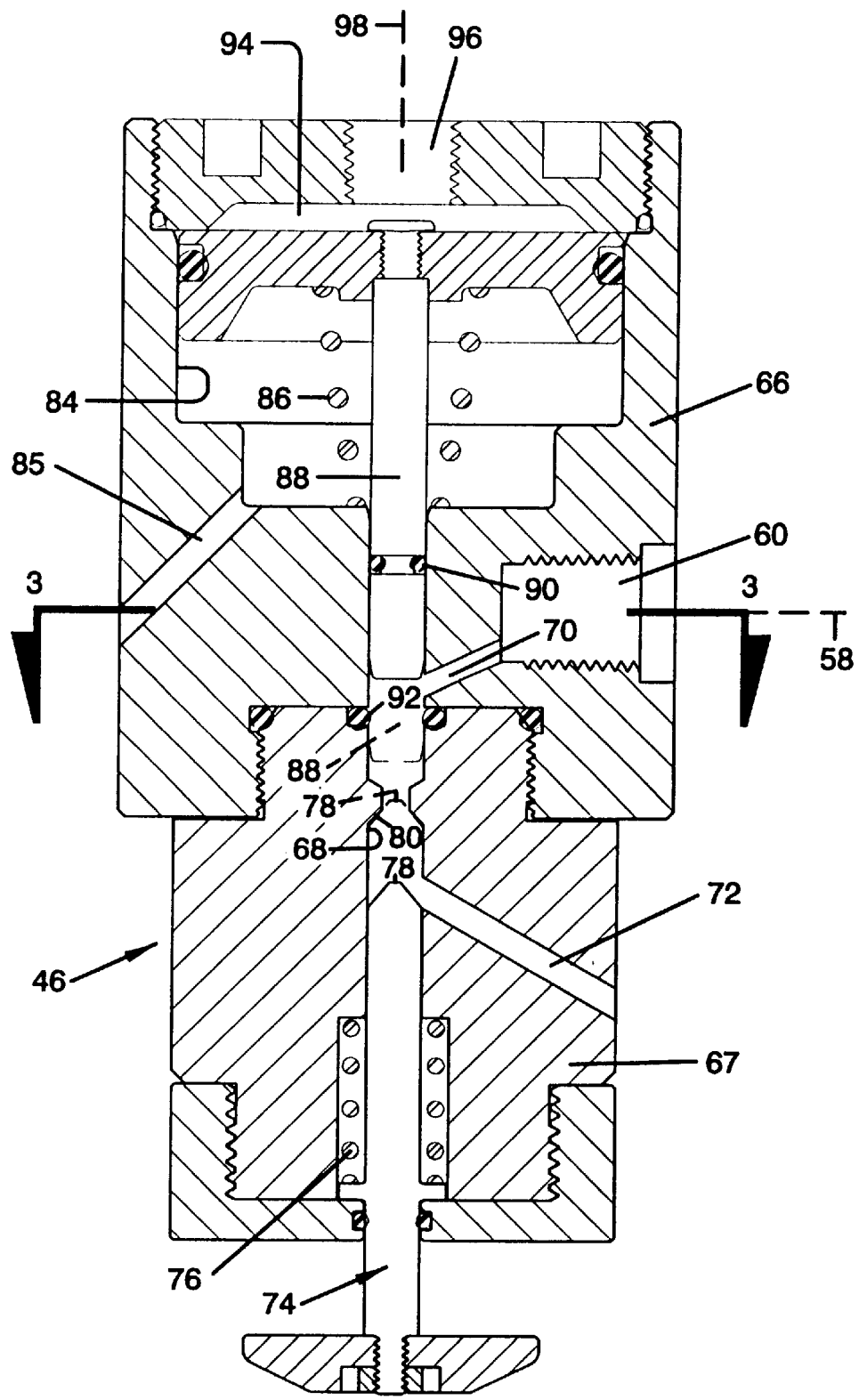
FIG. 2 is a longitudinal sectional view of a gas control valve for controlling the supply of pressurized gas to a gas operated product supply valve upstream of the flexible hose assembly for maintaining the product supply valve in an open position during normal operations and for effecting automatically a fast closing of the product supply valve to stop flow of the hazardous product upstream of the hose assembly upon a hose or coupling failure.
Figure 3:
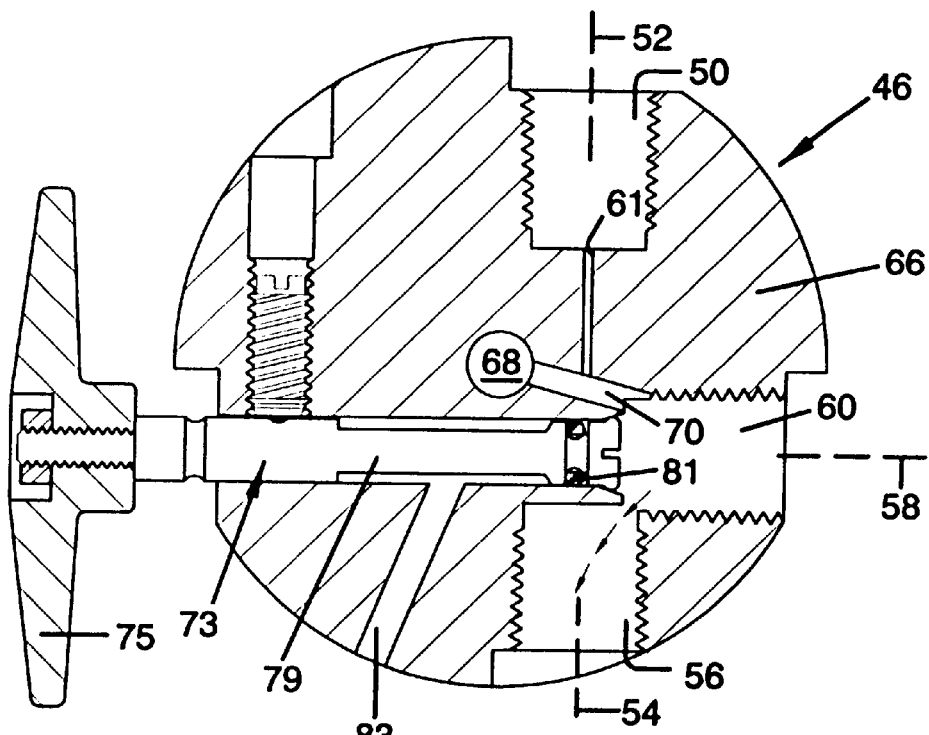
FIG. 3 is a cross sectional view of the gas control valve taken generally along line 3—3 of FIG. 2 and showing a manual actuator for the gas control valve with the actuator in a closed position in which pressurized gas is provided to the gas operated product supply valve.
Figure 4:
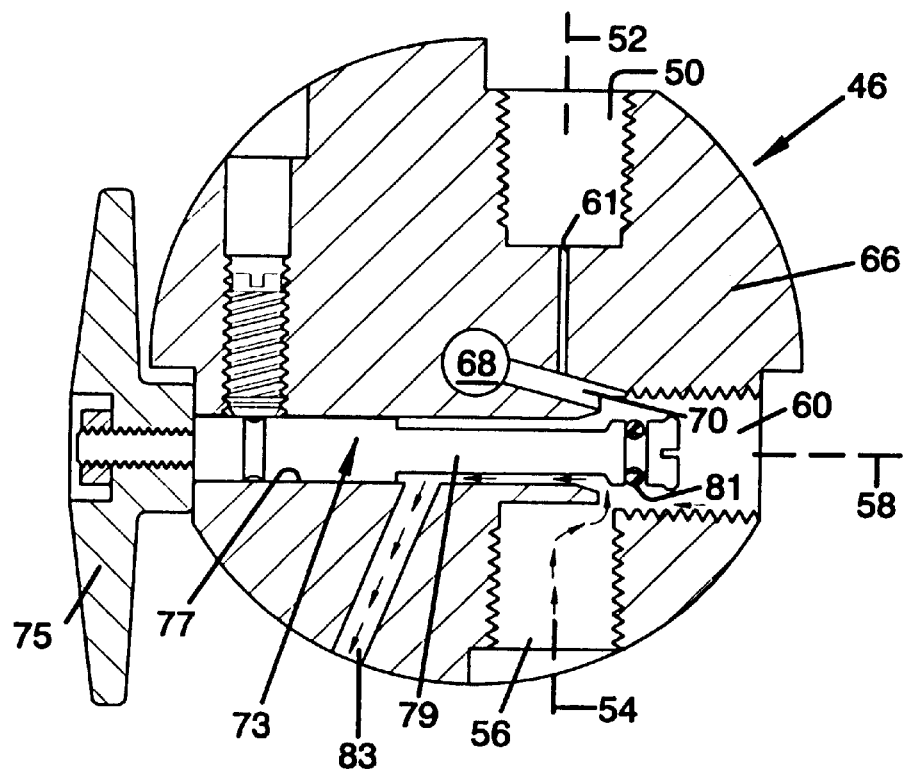
FIG. 4 is a cross sectional view similar to FIG. 3 but showing the manual actuator pushed inwardly manually to an exhaust position for venting the gas supply to the gas operated product supply valve to stop flow of the hazardous fluid product from the tank being unloaded.
Figure 6:
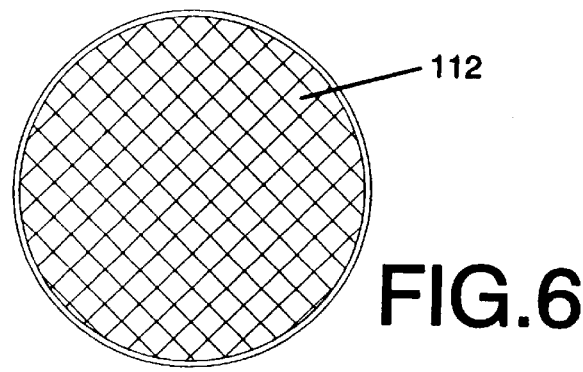
FIG. 6 is an end elevational view of a screen adjacent the end of the flexible hose assembly.

Referring also to FIGS. 2–4, a gas source 43 on roadway vehicle 12 comprises an air compressor for supplying pressurized air to air control valve 44 through line 52 and port 50. As shown particularly in FIG. 3, pressurized air from line 52 and port 50 is communicated through port 56 and line 54 to gas actuator 45 of gas operated product supply valve 44. A line 58 extends from port 60 and provides air to other areas of tank 10 typically with a fusible plastic line on which one or more manual dump valves 62, 64 are located. a fire would burn thru the plastic line 58 and initiate the shutdown sequence. Similar shutdown would occur if one of the strategically located dump valves 62 or 64 is activated manually. A restricted fluid passage 61 is in fluid communication with air supply port 50 and restricts the supply of air to line 58 in which dump valves 62 and 64 are mounted. Dump valves 62 and 64 are conventional dump valves and commonly utilized with a transport tank. Passage 61 restricts the supply of fluid from the pressurized source 43 to allow the manual or automatic exhaust action to close supply valve 44.

Air control valve 46 has a main body 66 with an end body portion 67 connected thereto and having a central bore 68 therein. A fluid passage 70 extends from port 60 to bore 68 and a vent passage 72 extends from bore 68 to atmosphere. A lateral bore 77 as shown in FIGS. 3 and 4 extends from port 60 through main body 66 and a vent passage 83 extends from lateral bore 77 to atmosphere. A manually operated laterally extending exhaust plunger is shown generally at 73 and has an outer handle 75 adapted to be gripped by an operator. Exhaust plunger 73 has a reduced diameter section 79 and an O-ring seal 81 is mounted about the inner end of plunger 73. In normal operation as shown in the position of FIG. 3, air supply port 50 is in fluid communication with port 56 and line 54 to gas actuator 45 to supply pressurized gas to gas operated product supply valve 44. When it is desired to manually initiate the exhaust and shutdown sequence, plunger 73 is manually pushed inwardly to the position of FIG. 4 for venting the pressurized air supply from line 54 to atmosphere through vent 83 thereof and also venting pressurized air from line 54 and gas actuator 45 to atmosphere through vent passage 83, which will close product supply valve 44.

A manually operated start-up plunger 74 is mounted in bore 68 in end body portion 67 as shown in FIG. 2. A spring 76 urges plunger 74 outwardly to a position so that the inner end 78 of plunger 74 clears vent passage 72. When start-up plunger 74 is manually pushed inwardly against seat 80, vent passage 72 is blocked from communication with bore 68 and air supply line 52 so that gas inlet port 50 is supplying pressurized gas to line 54 and gas operated product supply valve 44.

Air control valve 46 has a piston or piston valve member 82 mounted within a piston chamber 84 having a vent and condensate drain 85. A spring 86 urges piston 82 outwardly to the seated position shown in FIG. 2. A piston rod 88 extending inwardly from piston 82 is received within bore 68. An O-ring 90 extends about piston rod 88 and an O-ring 92 in bore 68 seals against piston rod 88 in the normal operating pressurized position of piston 82 and piston rod 88 as shown by the broken line position of piston rod 88 in FIG. 2.

Fluid sensing chamber 94 has a sensing port 96 provided adjacent piston 82 for continuously sensing the fluid pressure of the fluid product being transferred by detachable transfer hose assembly 30. The sensing line connected to port 96 for communicating the fluid pressure in the hazardous product being unloaded includes a flexible external sensing line section or tube generally designated at 98 extending between air control valve 46 to a fitting 100 secured to an end tubular sleeve 103 of flexible hose assembly 30, and an internal sensing line section or tube 102 extending from fitting 100 within flexible hose assembly 30. External sensing line section or tube 98 is detachable and is mounted between port 96 of air control valve 46 and fitting 100 at the unloading site. Internal sensing line tube 102 preferably comprises a plastic tube of about ¼ inch in diameter and having an open free end 104 positioned adjacent end coupling 34 for sensing the fluid pressure in the flowing product. As shown in FIG. 1, internal sensing line section or portion 102 extends downstream in hose assembly 30 from fitting 100 for a majority of the length of flexible hose assembly 30 which includes flexible hose 31.

Figure 5:
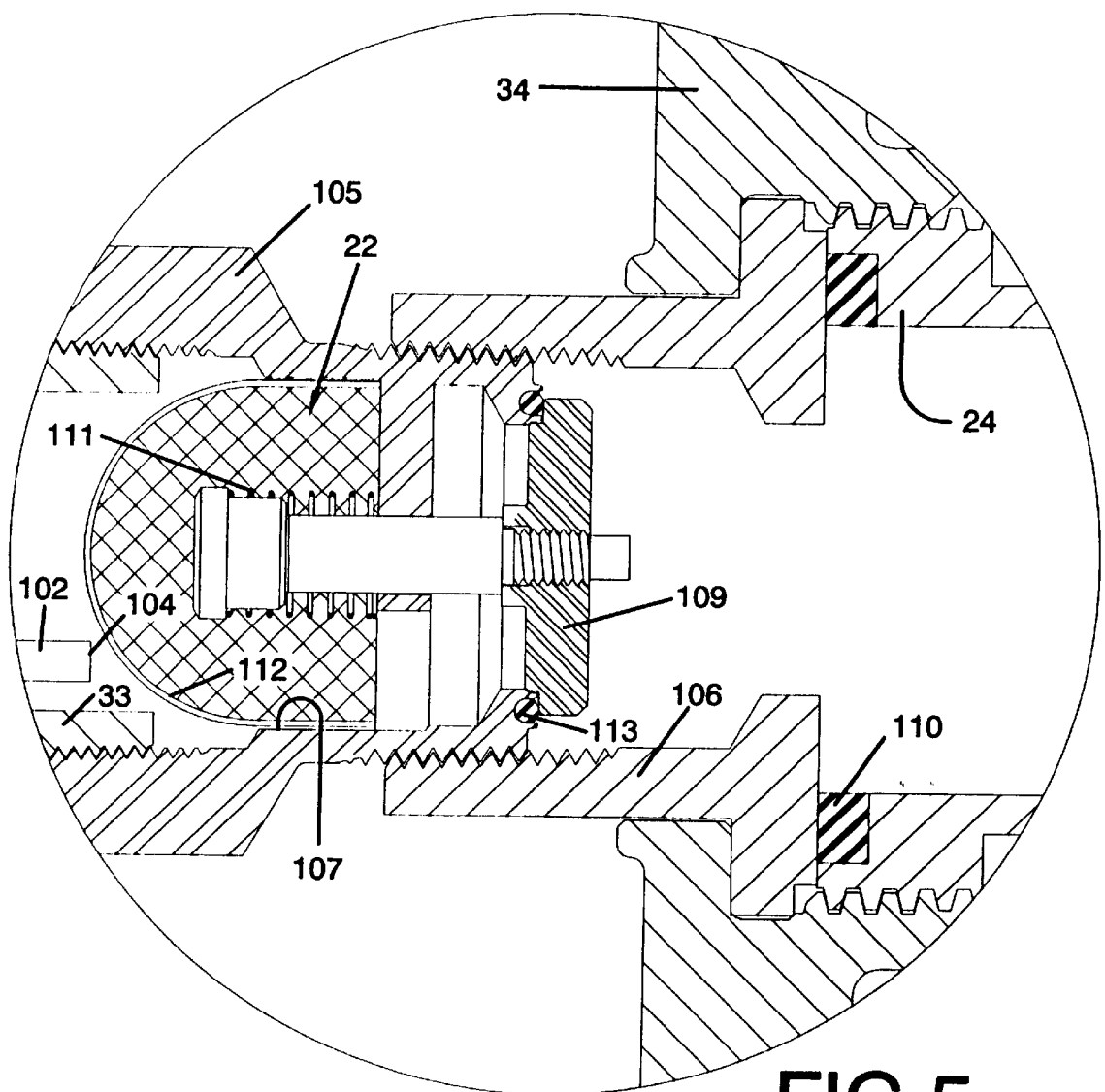
FIG. 5 is an enlarged fragmentary view of a coupling for detachably connecting an end of the flexible transfer hose assembly.

Check valve assembly 22 as shown on FIG. 5 includes an outer check valve body 105 having a bore 107 in which a dome-shaped protective screen 122 is mounted adjacent the free end 104 of plastic tube 102 as a safety device to prevent a loose internal sensing line tube 102 from moving downstream in the event of a separation of tube 102. Back check valve assembly 22 includes a check valve member 109 urged by spring 111 to a closed position. An O-ring 113 is provided for sealing back check valve member 109.

As shown further in FIG. 5, a connection is illustrated for connecting detachable transfer hose assembly 30 to externally threaded male member 24 of pipe 18 for storage tank 14. Back check valve body 105 is externally threaded and has an internally threaded tubular member 106 threaded thereon for supporting coupler 34. To connect hose assembly 30 to male pipe end 24, coupler 34 is manually rotated with internal screw threads on coupler 34 engaging externally threaded male member 24 with annular seal 110 sealing therebetween.

As shown in the Figures, the various ports in the gas control valve discussed above may be provided in only two monolithic bodies or body portions 66 and 67. The piston rod in body 66, which is responsive to the signal from the flexible hose assembly, is provided in the same body which is in fluid communication with the pressurized gas source. Inlet port 50 as shown in FIG. 3 is thus provided in the same body as the piston rod 88, and that same body contains both the supply port 60 to line 58 and the outlet port 56 to gas actuator 45. As shown in FIG. 3, the body 66 further includes the restart plunger 73 and the vent 83. The monolithic body 67 which contains the seal 92 which engages the valve stem or rod 88 to form the shut-off function of closing the product supply valve includes the vent line 72. The body 67 contains the manually operated startup plunger 74 and seat 80. The bore in body 67 which receives the plunger 74 is substantially aligned with the bore in body 66 which receives the piston rod, such that the piston rod and the plunger are in opposed relation. By reducing the number of connections, the gas control valve as discussed above improves the reliability of the system. Moreover, manufacturing and maintenance costs are reduced by simplification of the system, and the reduction in the number of moveable parts.

OPERATION

Upon arrival of roadway vehicle 12 and transport tank 10 at the unloading site for storage tank 14, transfer hose assembly 30 is connected by end couplings 34 and 36 to externally threaded male pipe members 24 and 40. Fitting 100 and internal sensing line tube 102 have been previously mounted on transfer hose assembly 30. The external sensing line tube 98 is then connected by quick disconnects to fitting 100 and port 96 of gas control valve 46. After connection of flexible hose assembly 30 and external sensing line tube 98, outlet valve 42 is manually opened. Then, pressurized air source 43 is energized and pressurized air from air supply line 52 is vented to atmosphere by gas control valve 46 through vent 70 as shown in FIG. 2. Start-up plunger 74 is in the position shown in FIG. 2 with air supply line 52 in fluid communication with port 60. To open gas operated product supply valve 44, start-up plunger 74 in a start-up operation is manually pushed inwardly to the broken line indication of FIG. 2 to close vent 72 for the supply of pressurized air through air supply line 52 to port 60 as shown in FIG. 3 for gas operated product supply valve 44 to open product supply valve 44 for the unloading of hazardous fluid product from transport tank 10. Fluid pressure of the hazardous fluid product being transferred by hose assembly 30 is communicated from end 104 of internal sensing tube 102 to external sensing tube 98 and sensing chamber 94 to move piston 82 inwardly to block vent 70. In this position, manual pressure on start-up plunger 74 may be released to permit return of plunger 74 under the bias of spring 76 to the extended position shown in FIG. 2. Gas operated product supply valve 44 thus remains open.

The pressure of the hazardous product being unloaded, such as propane, may vary substantially from ambient temperatures. For example, propane has a pressure of 150 psi at 90F, 50 psi at 0F, and 25 psi at –20F. Thus, any passive shut-off system must be effective for a wide variation in pressures of the hazardous fluid product being unloaded. A fluid pressure of about 10 psi or greater is effective for movement of piston 82 against the bias of spring 86. Spring 86 may be set for actuation of piston 82 at a predetermined fluid pressure.

In the event of a hose or coupling rupture or failure, the hazardous fluid product will be discharged into the atmosphere resulting in a decrease in the fluid pressure being sensed at end 104 of internal sensing tube 102. The fluid pressure is transmitted through external sensing tube 98 to sensing chamber 94. The fluid pressure in fluid chamber 94 when it reaches 10 psi or less results in piston 82 moving to the seated position shown in FIG. 2. Line 54 is vented to atmosphere through vent passages 70 and 72 which results in the closing of gas operated product supply valve 44 thereby to stop the flow of hazardous product from tank 10. Any flow from storage tank 14 is stopped by back check valve member 109 adjacent end coupling 34. Supply air continues to enter the system thru restriction 61 but at a rate less than the venting rate thru vent 72. Thus, a highly effective shut-off means is automatically achieved without human intervention within a very short time period. Any decrease in fluid pressure in the sensing line below a fluid pressure of 10 psi or other predetermined fluid pressure will automatically result in the closing of gas operated product supply valve 44.

EMBODIMENT OF FIG. 7

Figure 7:
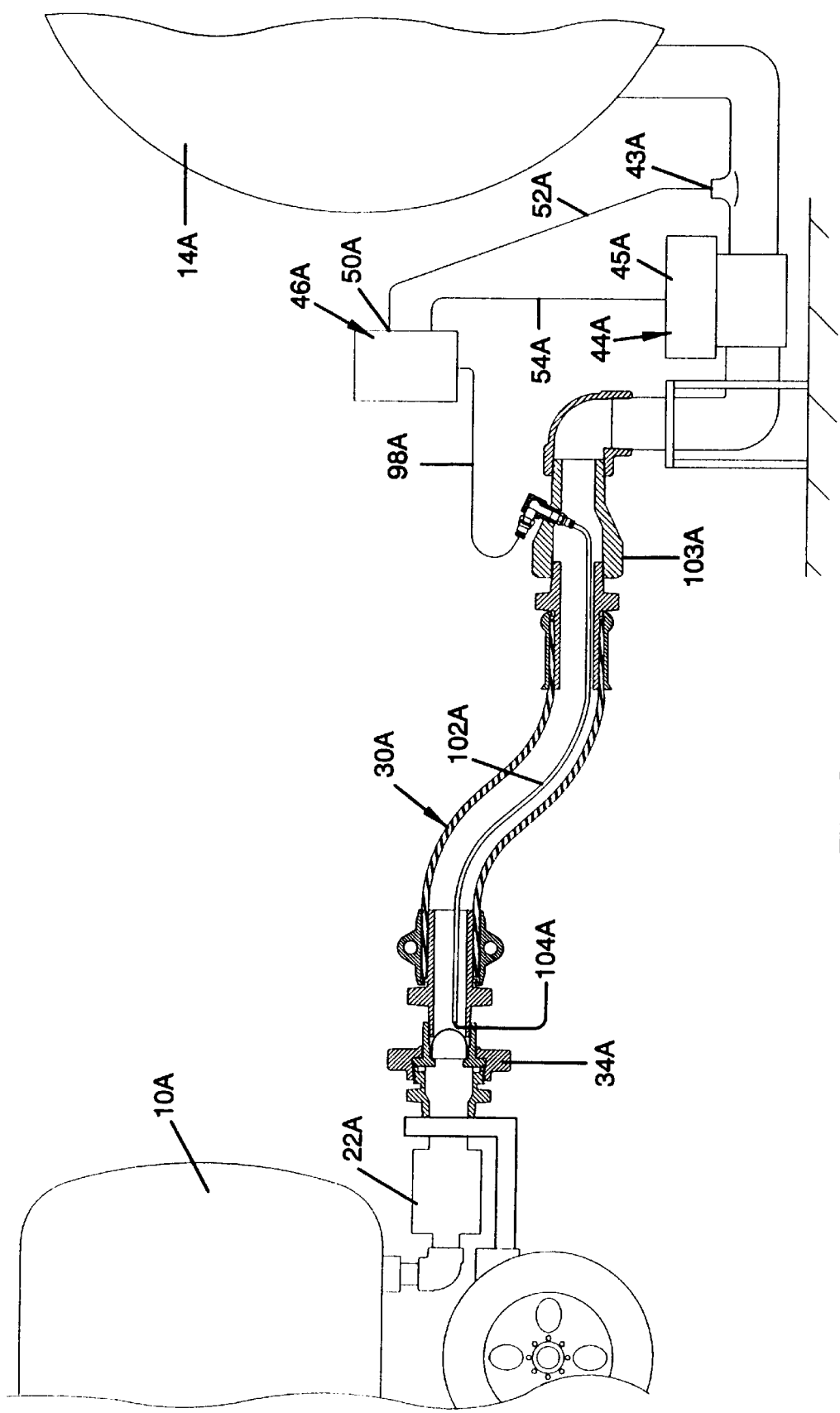
FIG. 7 is a schematic view of a modification of the system comprising the present invention in which the hazardous fluid product is being transferred from the fixed storage tank to the tank of a roadway vehicle.

The embodiment shown in FIG. 7 illustrates the transfer of hazardous fluid product from storage tank 14A to roadway vehicle tank 10A. The ends of flexible hose assembly 30A are reversed from the embodiment of FIGS. 1–6 and end couplings 34A and 103A of flexible hose assembly 30A are connected to tank 10A and storage tank 14A. External sensing line 98A extends to gas control valve 46A which is similar to gas control valve 46 in the embodiment of FIGS. 1–6 but does not include a port or passage for a separate air supply line to other areas such as illustrated by port 60 and line 58 in the embodiment shown in FIGS. 1–6. Line 54A extends from gas control valve 46A to the gas operated product supply valve 44A having a gas actuator 45A. A pressurized gas source port 43A utilizing the stored product pressure has a line 52A extending therefrom to port 50A of gas control valve 46A. The operation of gas operated product supply valve 44A is similar to valve 44 shown in the embodiment of FIGS. 1–6. A back check valve 22A is normally provided for tank 10A and upon the rupture or separation of hose assembly 30A, back check valve 22A will stop the flow of fluid from tank 10A. A drop in fluid pressure occurs in sensing lines 98A and 102A to gas control valve 46A upon a failure in hose assembly 30A and is effective to exhaust pressurized gas from the gas operated product supply valve 44A to close gas operated product supply valve 44A to stop the flow of hazardous product from storage tank 14A.

This invention is particularly directed to loading and unloading hazardous product between the tank of a roadway vehicle and a storage tank with a flexible detachable hose assembly connected at opposed ends to the tanks. The tank being unloaded has a gas operated product supply valve and the gas control valve of the present invention is effective to exhaust pressurized gas from the gas operated product supply valve in the event of a failure in the flexible hose assembly for stopping the flow of the hazardous product from the tank being unloaded without human intervention. Various types of gas control valves may be provided to effect an exhaust of pressurized fluid from a gas operated product supply valve on a tank to stop automatically without human intervention the flow of hazardous product from the tank being unloaded. The present invention shows one gas control valve which has been found to be highly effective but it is apparent that various other gas control valves might be effective and within the scope of the present invention.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In apparatus for transferring a hazardous fluid product through a flexible hose assembly having opposed upstream and downstream ends detachably coupled between a tank of a roadway vehicle and a fixed storage tank, one of said tanks having a gas operated product supply valve maintained in an open position for downstream product flow to the other tank by pressurized gas from a pressurized gas source during a normal product transfer operation; a gas control assembly for controlling the supply of pressurized gas to said gas operated product supply valve; said gas control assembly comprising:

a gas control valve mounted between said pressurized gas source and said gas operated product supply valve to control the supply of gas to said product supply valve; and a fluid sensing line for said flexible hose assembly for sensing the fluid pressure therein of product flowing between said tanks during normal transfer operation; said fluid sensing line having an internal portion extending downstream in said flexible hose assembly from said upstream end along at least a majority of a length of said flexible hose assembly between said upstream and downstream ends;

said gas control valve having a valve member therein movable between a normal product transfer position to permit fluid flow to said product supply valve to maintain said product supply valve open, and an emergency position for exhausting gas from said gas operated product supply valve for closing of said product supply valve and stopping product flow from said tank being unloaded; said valve member responsive to said fluid sensing line and moving to said emergency position upon a reduction in fluid pressure in said fluid sensing line below a predetermined minimal fluid pressure.

2. In apparatus as defined in claim 1 wherein said flexible hose assembly includes a flexible hose and said internal portion of said sensing line extends downstream within said flexible hose for substantially the entire length of said flexible hose.

3. In apparatus as defined in claim 1, wherein a fitting is mounted on said flexible hose assembly and said internal portion of said sensing line is connected to an end of said fitting and extends substantially downstream therefrom, said sensing line including an external portion connected to an opposed end of said fitting and extending between said hose assembly and said gas control valve.

4. In apparatus as defined in claim 1 wherein said internal portion of said sensing line comprises a plastic tube having an open free end facing in a downstream direction.

5. In apparatus as defined in claim 1, wherein said gas control valve has a body including an inlet port in fluid communication with said gas source, an outlet port in fluid communication with said product supply valve, and a vent between said ports; and a manually operated start-up valve member is positioned within said valve body for blocking fluid communication between said inlet port and vent upon manual actuation thereof to permit fluid communication between said inlet port and outlet port and opening of said product supply valve for start-up of the normal product transfer operation.

6. In apparatus as defined in claim 5 wherein said manually operated start-up valve member comprises a plunger and a spring member continuously urges said plunger to a position permitting fluid communication between said inlet port and said vent.

7. In apparatus as defined in claim 5 wherein said valve member comprises a piston and a sensing chamber adjacent said piston in fluid communication with said fluid sensing line, and said piston has a piston rod movable upon actuation of said piston to a position blocking fluid communication between said inlet port and vent in said normal transfer operation.

8. In apparatus as defined in claim 1 wherein said gas operated product supply valve is connected to said roadway vehicle tank and said hazardous fluid product is transferred from said roadway vehicle tank to said storage tank.

9. In apparatus as defined in claim 1 wherein said gas operated product supply valve is connected to said storage tank and said hazardous fluid product is transferred from said storage tank to said roadway vehicle tank.

10. A method for transferring a hazardous fluid product through a flexible hose assembly detachably coupled between a tank of a roadway vehicle and a fixed storage tank, one of said tanks having a gas operated product supply valve maintained in an open position for product flow to the other tank by pressurized gas during a normal transfer operation; said method comprising:

providing a gas control valve for controlling the supply of pressurized gas to said gas operated product supply valve and movable between a supply position providing pressurized gas to said product supply valve and an exhaust position exhausting pressurized gas from said product supply valve, said gas control valve responsive to fluid pressure of the product flowing through said flexible hose assembly between said tanks;

providing an external portion of a fluid sensing line for said flexible hose assembly for communicating fluid pressure from said flexible hose assembly to said gas control valve to maintain said gas control valve in a supply position when the fluid pressure in said flexible conduit is above a predetermined minimum and to exhaust pressurized gas from said product supply valve in an exhaust position when the fluid pressure in said flexible hose assembly is below a predetermined minimum to stop the transfer of product from said one tank; and positioning an internal portion of said fluid sensing line within said flexible hose assembly prior to coupling said flexible hose assembly between the vehicle tank and the fixed storage tank, said internal portion being a flexible tube extending longitudinally downstream along said flexible hose assembly toward said other tank for a majority of a length of said flexible hose assembly.

11. The method as defined in claim 10, further comprising:

removably connecting said external portion of said sensing line between said flexible hose assembly and said gas control valve.

12. The method as defined in claim 10, further comprising:

providing a manually operated dump valve member for said gas control valve to exhaust pressurized gas from said gas operated product supply valve upon manual actuation thereof.

13. The method as defined in claim 10, further comprising:

providing a manually operated start-up valve member for said gas control valve to permit pressurizing of said product supply valve for initial opening of said product supply valve for start up operation.

14. The method as defined in claim 10, further comprising:

providing a back check valve in said flexible hose assembly to prevent a fluid back flow from said other tank.

15. A system for transferring a hazardous fluid product between a tank of a roadway vehicle and a fixed storage tank, one of said tanks being unloaded and having a gas operated product supply valve maintained in an open position for product flow to the other receiving tank by pressurized gas from a gas source, said system including:

a flexible hose assembly detachably connected between said tanks;

a fluid sensing line in fluid communication with said flexible hose assembly for sensing the fluid pressure of product flowing between said tanks during a normal transfer operation;

a gas control valve mounted between said gas source and said product supply valve to control the supply of gas to said product supply valve, said gas control valve having a body and a central bore therein, said body having an inlet port in fluid communication with said bore and said gas source, an outlet port in fluid communication with said bore and said product supply valve, and a sensing port in fluid communication with said sensing line;

a piston chamber in said body having a piston mounted thereon and a piston rod received within said central bore, said piston chamber being in fluid communication with said sensing port;

a vent from said central bore to atmosphere in fluid communication with said outlet port and normally closed by said piston rod from fluid communication with said outlet port;

a member urging said piston rod to an open position of said vent to exhaust gas from said gas operated product supply valve for closing of said product supply valve; and said piston moving to an emergency position upon a reduction of fluid in said fluid sensing line and sensing port below a selected minimal fluid pressure, said piston rod moveable in the emergency position to an exhaust position to permit exhaust of gas through said outlet port and vent from said gas operated product supply valve for closing of said product supply valve.

16. The system as defined in claim 15, further comprising:

another vent to atmosphere in said body in fluid communication with said outlet port;

a lateral bore extending within said body in fluid communication with said another vent; and a manually operated plunger extending within said lateral bore of said body between said outlet port and said another vent and movable manually between a retracted and a projected position, said plunger in said retracted position blocking fluid communication between said outlet port and said another vent during normal operation, said plunger upon manual movement to said projected position permitting fluid communication between said outlet port and said another vent through said lateral bore for closing of said product supply valve.

17. The system as defined in claim 15, further comprising:

a manually operated plunger mounted within said central bore of said body in opposed relation to said piston rod and moveable manually in said central bore between a retracted position and a projected position relative to said vent, said plunger in said retracted position permitting fluid communication between said outlet port and said vent through said central bore during normal operation, and said plunger in said projected position blocking fluid communication between said outlet port and said vent through said central bore during a start-up operation after closing of said product supply valve.

18. The system as defined in claim 15, wherein said inlet port has a restriction for the supply of gas to said central bore at a rate less than a venting rate of said vent to allow said product supply valve to be closed while inlet gas is continuously supplied to said system in the emergency position.

19. The system as defined in claim 15, further comprising:
a flow restriction upstream of said central bore to restrict the gas supply to said central bore, said flow restriction supplying gas to said central bore at a rate less than venting rate of said vent to allow said product supply valve to be closed while inlet gas is continuously supplied to said system.

20. The system defined in claim 15, further comprising:
an air supply port in said body in fluid communication with said inlet port and restriction, and a gas supply line extending from said air supply port; and
a plurality of dump valves in fluid communication with said gas supply line, said restriction in said inlet port restricting the supply of gas to said dump valves.

21. The system defined in claim 15, further comprising:
a fluid passage in said body between said inlet port and said outlet port to provide fluid communication therebetween, said passage being in fluid communication with said bore.

22. The system as defined in claims 21, wherein said fluid passage at one end is in fluid communication with said bore adjacent said piston rod and at an opposed end is in fluid communication with said outlet port, said inlet port being in fluid communication with said fluid passage and central bore between said ends.

23. The system as defined in claim 15, wherein said body includes a pair of connected body portions each having said central bore therein, said piston and piston rod mounted on one body portion with said piston rod received within a first bore, and a manually operated plunger mounted within a second bore in the other body portion, said first and second bores being substantially aligned such that the plunger is in opposed relation to said piston rod.

24. The system as defined in 23, wherein said vent is in said other body portion and is closed upon manual movement of said plunger inwardly.

25. The system as defined in claim 15, further comprising:
a back check valve in said flexible hose detachably connected between said tanks to prevent fluid flow from said receiving tank.

26. The system as defined in claim 25, further comprising:
a tubular member threaded onto a downstream end of said flexible hose, said back check valve being mounted within said end of said flexible hose adjacent said tubular member.

27. A system for transferring a hazardous fluid product between a tank of a roadway vehicle and a fixed storage tank, one of said tanks being unloaded and having a gas operated product supply valve maintained in an open position for product flow to the other tank by pressurized gas from a gas source, said system including:
a flexible hose assembly detachably connected between said tanks for product flow during a normal transfer operation;

a gas control valve mounted between said gas source and said product supply valve to control the supply of gas to said product supply valve, said gas control valve having a body and a central bore therein, said body having an inlet port in fluid communication with said bore and said gas source, an outlet port in fluid communication with said product supply valve, and a sensing port in fluid communication with said flexible hose assembly;

a piston chamber in said body having a piston therein in fluid communication with said flexible hose assembly, said piston chamber being in fluid communication with said sensing port;

a vent from said central bore to atmosphere providing fluid communication with said outlet port in an exhaust position of said product supply valve;

said piston moving to an emergency position for permitting fluid communication between said outlet port and said vent upon a reduction of fluid pressure in said flexible hose assembly below a selected minimal fluid pressure to exhaust gas through said central bore and vent from said outlet port and said gas operated product supply valve for closing of said product supply valve; and a flow restriction upstream of said central bore for the supply of inlet gas to said central bore at a rate less than a venting rate of said vent to allow said product supply valve to be closed while continuously supplying inlet gas to said system.

28. The system defined in claim 27, further comprising:
a gas supply port in said body and a gas supply line extending from said gas supply port; and
a plurality of dump valves in said gas supply line, said restriction providing a continuous supply of gas to said dump valves.

29. The system as defined in claim 27, further comprising:
a fluid passage between said inlet port and said outlet port to provide fluid communication therebetween, said fluid passage being in fluid communication with said bore.

30. The system as defined in claim 29, wherein said fluid passage at one end is in fluid communication with said bore and at an opposed end is in fluid communication with said outlet port, said inlet port being in fluid communication with said fluid passage between said ends.

31. The system as defined in claim 27, further comprising:
a flow passage between said outlet port and said bore to provide fluid communication therebetween for venting of gas from said vent in an emergency position, said piston having a piston rod in said bore blocking fluid communication between said flow passage and said bore during a normal transfer operation to block venting of gas from said vent.

32. The system as defined in claim 31, wherein said flow restriction is in continuous fluid communication with said flow passage between said bore and said outlet port.

33. The system as defined in claim 27, further comprising:
another vent to atmosphere in fluid communication with said outlet port;
a lateral bore extending within said body in communication with said another vent; and
a manually operated plunger extending within said lateral bore and movable manually between a retracted and a projected position, said plunger in said retracted position blocking fluid communication between said outlet port and said another vent during normal operation, said plunger upon manual movement to said projected position permitting fluid communication between said outlet port and said another vent for closing of said product supply valve.

34. The system as defined in claim 27, further comprising:

a manually operated plunger mounted in said central bore and moveable manually between a retracted position and a projected position relative to said vent, said plunger in said retracted position permitting fluid communication between said outlet port and said vent during normal operation, said plunger blocking fluid communication between said outlet port and said vent in said projected position during a start-up operation after closing of said product supply valve.

35. A gas control valve for mounting between a gas source and a product supply valve to control the supply of gas to the product supply valve, said gas control valve comprising:

a monolithic body having a central bore therein, said body having an inlet port in fluid communication with said bore, an outlet port in fluid communication with said bore, and a sensing port;

a piston chamber in said body having a piston mounted thereon and a piston rod received within said central bore, said piston chamber being in fluid communication with said sensing port;

a vent from said central bore to atmosphere in fluid communication with said outlet port and normally closed by said piston rod from fluid communication with said outlet port; and said piston moving to an emergency position upon a reduction of fluid in said fluid sensing port below a selected minimal fluid pressure, said piston rod moveable in the emergency position to an exhaust position to permit exhaust of gas through said outlet port and vent for closing the product supply valve.

36. The gas control valve as defined in claim 35, further comprising:

a manually operated plunger mounted within said central bore in opposed relation to said piston rod and moveable manually in said central bore to a projected position for blocking fluid communication between said outlet port and said vent through said bore.

37. The gas control valve as defined in claims 36, wherein said gas control valve comprises a pair of connected body portions each having a bore portion to define said central bore, said plunger and said vent being positioned within one body portion, said piston chamber and piston being positioned within the other by portion.

38. The gas control valve as defined in claim 35, further comprising:

a lateral bore in said body in fluid communication with said central bore;

another vent in said body extending to atmosphere from said one lateral bore; and a manually operated plunger within said lateral bore normally blocking fluid communication between said outlet port and said another vent through said central bore, said plunger movable manually to a projected position to permit fluid communication between said outlet port and said another vent through said central bore for venting gas from said central bore.

39. The gas control valve as defined in claim 35, further comprising:

a flow restriction upstream of said central bore to restrict the gas supply to said central bore, said flow restriction supplying gas to said central bore at a rate less than venting rate of said vent to allow said product supply valve to be closed while inlet gas is continuously supplied to said system.

40. The gas control valve as defined in claim 35, further comprising:

an air supply port in said body in fluid communication with said inlet port and restriction, and a gas supply line extending from said air supply port; and a plurality of dump valves in fluid communication with said gas supply line, said restriction in said inlet port restricting the supply of gas to said dump valves.

41. The gas control valve as defined in claim 35, further comprising:

a fluid passage in said body between said inlet port and said outlet port to provide fluid communication therebetween, said passage being in fluid communication with said bore.

42. The system as defined in claim 35, wherein said inlet port has a restriction for the supply of gas to said central bore at a rate less than a venting rate of said vent to allow said product supply valve to be closed while inlet gas is continuously supplied to said system in the emergency position.

* * * * *

UNITED STATES PATENT AND TRADEMARK OFFICE
CERTIFICATE OF CORRECTION

PATENT NO. : 6,308,753 B1
DATED : October 30, 2001
INVENTOR(S) : Nimberger et al.

It is certified that error appears in the above-identified patent and that said Letters Patent is hereby corrected as shown below:

<u>Column 13,</u>
Line 45, change "defined in claims" to -- defined in claim --

<u>Column 14,</u>
Line 3, change "the other by portion" to -- the other body portion --

Signed and Sealed this

Nineteenth Day of March, 2002

Attest:

JAMES E. ROGAN
*Director of the United States Patent and Trademark Office*

*Attesting Officer*